United States Patent [19]

Decker

[11] 4,427,220
[45] Jan. 24, 1984

[54] FLEXIBLE JOINT FOR CONDUIT

[75] Inventor: Maurice S. Decker, Columbus, Ohio

[73] Assignee: Midland-Ross Corporation, Cleveland, Ohio

[21] Appl. No.: 244,146

[22] Filed: Mar. 16, 1981

[51] Int. Cl.³ .............................................. F16L 27/04
[52] U.S. Cl. .................................... 285/263; 285/165; 285/267; 285/351
[58] Field of Search .............. 285/263, 267, 268, 167, 285/165, 351, 55

[56] References Cited

U.S. PATENT DOCUMENTS

| 927,462 | 7/1909 | Greenlaw | 285/267 |
| 1,510,755 | 10/1924 | Weir et al. | 285/267 X |
| 2,846,242 | 8/1958 | Drake | 285/263 |
| 3,995,896 | 12/1976 | Decker | 285/233 |

FOREIGN PATENT DOCUMENTS 1407838  6/1965  France ................................ 285/263
648788  2/1979  U.S.S.R. ............................. 285/263

Primary Examiner—Dave W. Arola
Attorney, Agent, or Firm—H. Duane Switzer

[57] ABSTRACT

A flexible joint for conduit includes inner and outer conduit parts having a common longitudinal axis. The inner conduit part includes a spherically curved end portion received in the outer conduit part and having inner and outer surfaces. Inner and outer ring assemblies carried by the outer conduit part include inner and outer rings of low friction material engaging the inner and outer surfaces on the curved end portion of the inner conduit. The curved end portion is squeezed between the inner and outer ring assemblies with predetermined preloading force to provide the sole connection between the conduit parts. The conduit parts are pivotally movable relative to one another during which the ring assemblies and the inner and outer surfaces of the curved end portions slide past one another.

27 Claims, 3 Drawing Figures

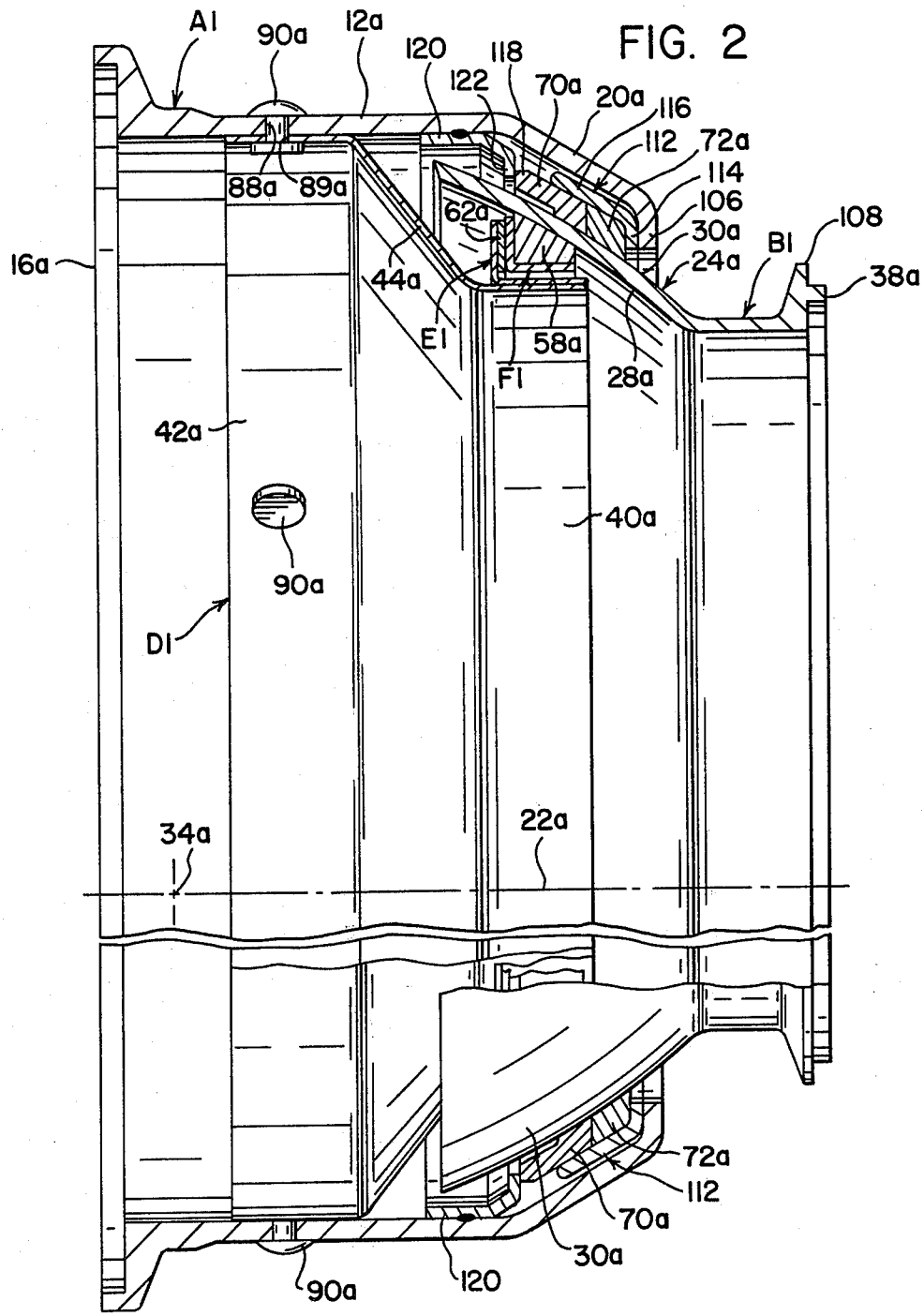

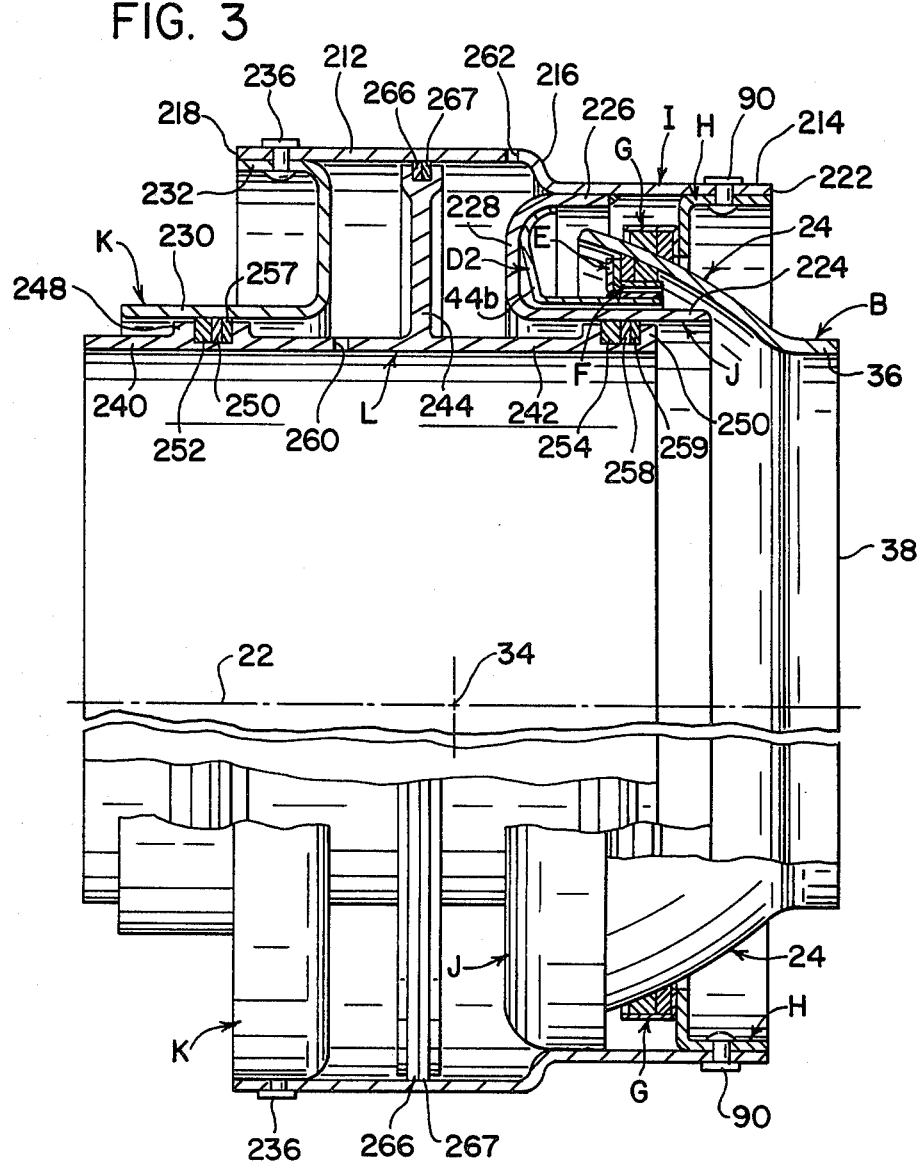

FLEXIBLE JOINT FOR CONDUIT

BACKGROUND OF THE INVENTION

This application pertains to the art of joints and, more particularly, to flexible sealed joints for conduit. The invention is particularly applicable for use in jet engine bleed air duct systems and will be described with reference thereto. However, it will be appreciated that the invention has broader aspects and may be used in any conduit system wherein limited flexing of sealed joints is desirable for relieving high thermal and structural stresses by deflecting under low bend loads.

It is conventional on jet aircraft to bleed air from the engine compressors for such purposes as aircraft air conditioning, heating, pressurization and anti-icing. The ducting for such bleed air is subjected to a wide range of temperatures and high bend loads are imposed on duct joints as a result of thermal expansion and/or movement, particularly in the ducting takeoff from the bleed pad to common manifolds or other equipment. In order to withstand the high bend loads, stronger manifolds and joints have been used. However, this simply stiffens the ducting at the joints and bend loads become even greater.

Flexible joints have been used for deflecting under the bend loads and such flexible joints have been made using metal bellows. Flexible metal bellows are subject to fatigue failure and are not highly reliable. Another flexible sealed joint is described in U.S. Pat. No. 3,995,896 issued Dec. 7, 1976, to Decker. In the arrangement of the Decker patent, a sealing ring of low friction material, such as carbon, engages one surface of a spherical portion on an internal conduit. A gimbal arrangement is required for pivotally connecting the inner conduit to an outer conduit. The single continuous sealing ring of carbon is also subject to breakage when the parts expand and this could result in seal failure or considerable leakage.

It would be desirable to have a reliable pneumatic joint which was capable of taking the necessary deflections in ducting of the type described. It would further be desirable to have such a joint which could withstand a jet engine environment with an increased life expectancy, as compared to a metal bellows, and yet could be easily refurbished. It would also be desirable to have such a joint which would not require the use of a gimbal arrangement for pivotally connecting inner and outer conduit parts.

SUMMARY OF THE INVENTION

A flexible joint for conduit includes inner and outer conduit parts. The inner conduit part has a generally spherically curved end portion received in the outer conduit part and includes inner and outer surfaces. Inner and outer ring assemblies including inner and outer rings of low friction material engage and the inner and outer surfaces of the curved end portion. Preloading means axially preloads the joint and holds the inner and outer rings against the inner and outer surfaces of the curved end portion with predetermined preloading force. In the preferred arrangement, the ring assemblies provide the sole connection between the conduit parts. The conduit parts are pivotally movable relative to one another during which the ring assemblies and the inner and outer surfaces of the curved end portion slide past one another.

In one arrangement, the preloading means includes inner and outer axial stops on the outer conduit part, and between which the ring assemblies and curved end portion of the inner conduit are under generally axial compression.

The rings of low friction material are preferably of carbon. However, it will be recognized that rings of other materials having a very low coefficient of friction can be used. For example, metal composites or plastic composites can be used depending upon the temperatures to which the joint will be exposed.

The ring assemblies preferably include a pair of side-by-side sealing rings having splits therein for providing generally radial expansion and contraction of the rings. The pair of rings are assembled with their splits circumferentially-spaced from one another.

With inner and outer ring assemblies, the inner ring assembly is primarily a bearing ring, while the outer ring assembly is a bearing and sealing ring assembly. The outer sealing ring assembly has the pair of sealing rings, and define primary and secondary sealing rings. The primary ring has an axial thickness substantially greater than the secondary ring, and the primary ring is located closer to the terminal end of the curved end portion on the inner conduit than the secondary ring.

An axially yieldable spring ring fixed to the outer conduit part has an inner backup ring mounted thereto. The inner ring assembly is positioned against the inner backup ring, with the inner ring of low friction material engaging the inner surface of the curved end portion on the inner conduit part. A retainer ring fixed to the outer conduit part in compressive engagement with the outer ring assembly holds the spring ring axially deflected for providing a preloading force.

The secondary sealing ring of the outer ring assembly may have an inner circumferential area engaging the outer surface of the curved end portion which is substantially smaller than the outer circumferential area thereof. Fluid pressure acting on the outer circumferential area causes the inner circumferential area to engage the outer surface of the curved end portion with a greater unit force.

It is a principal object of the present invention to provide an improved flexible sealed joint for conduit.

It is also an object of the invention to provide such a joint which has a long life and is easily repairable.

It is another object of the invention to provide such a joint which is very reliable in operation and substantially eliminates any leakage.

It is a further object of the invention to provide such a joint wherein the sole pivotal connection between inner and outer conduits is defined by inner and outer ring assemblies of low friction material.

It is also an object of the invention to provide an improved method of assembling a joint to provide a predetermined preloading force.

BRIEF DESCRIPTION OF THE DRAWING

FIG. 2 is a view similar to FIG. 1 and showing a different form of ring assembly; and FIG. 3 is a partial cross-sectional elevational view of a flexible sealed joint capable of accommodating pivotal, rotational and longitudinal movement.

DESCRIPTION OF PREFERRED EMBODIMENTS

Figure 1:
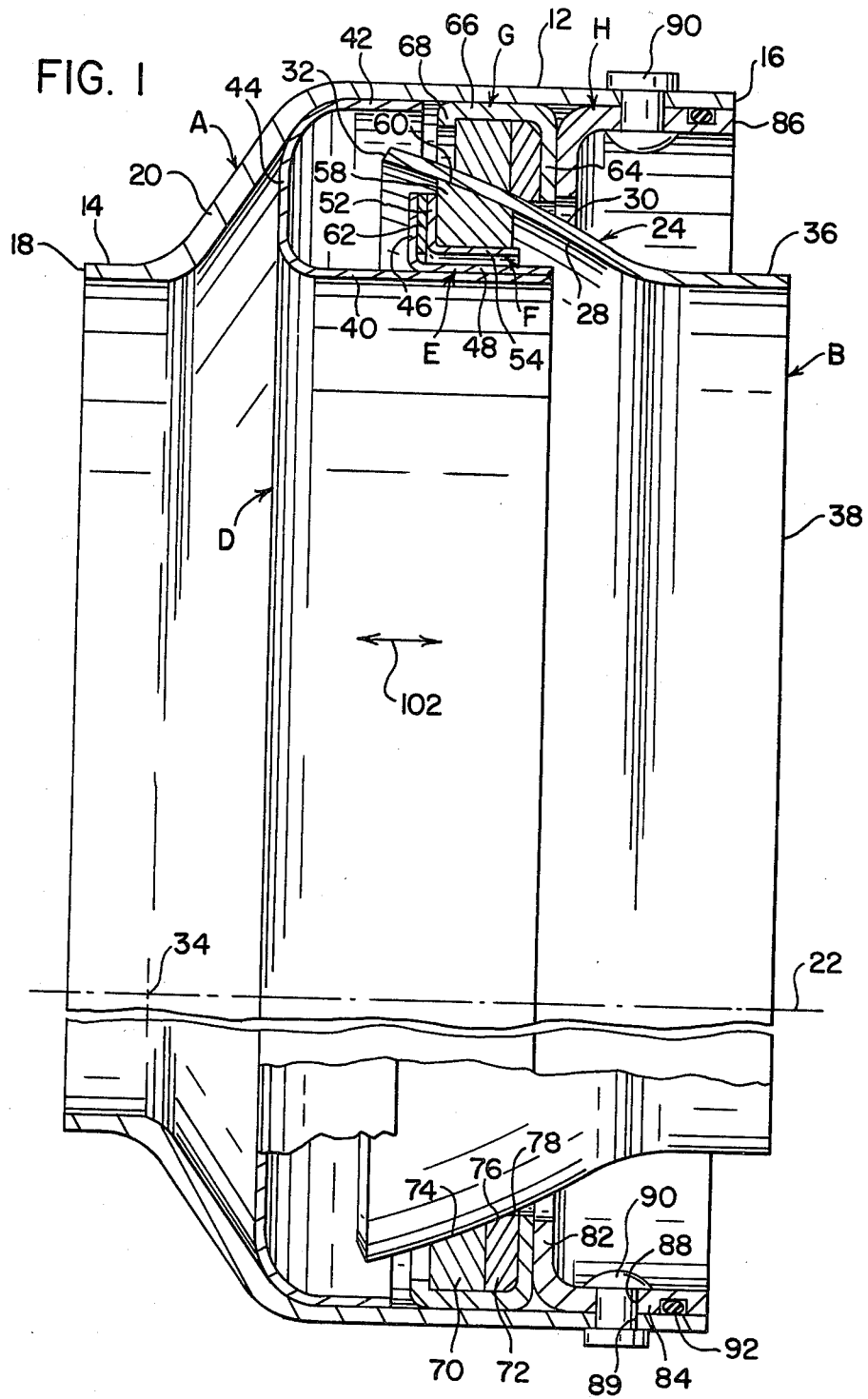
FIG. 1 is a partial cross-sectional elevational view of a flexible sealed joint constructed in accordance with the present application.

With reference to the drawing, FIG. 1 shows an outer conduit part A having a large diameter outwardly belled cylindrical portion 12 and a substantially smaller diameter cylindrical portion 14. Outer conduit part A has opposite circular terminal ends 16 and 18. Large diameter conduit portion 12 is integrally connected with small diameter conduit portion 14 by an inwardly inclined conduit wall 20.

An inner conduit part B has a common longitudinal axis 22 with outer conduit part A. Inner conduit part B has a generally spherically outwardly curved end portion 24 including parallel inner and outer surfaces 28, 30 and a terminal end 32. Spherically curved end portion 24 of inner conduit part B is curved about a point 34 substantially on longitudinal axis 22. Point 34 is located intermediate terminal end 32 of curved end portion 24 and terminal end 18 of outer conduit part A. The diameter of terminal end 32 on curved end portion 24 is intermediate the diameters of terminal ends 16 and 18 on outer conduit part A. Inner conduit part B includes a cylindrical portion 36 having a circular terminal end 38. The diameter of terminal end 38 on inner conduit part B may be slightly greater than the diameter of terminal end 18 on outer conduit part A so that the inner cylindrical surface of cylindrical portion 36 is approximately coincidental with, or spaced slightly outward of, the inner cylindrical surface of cylindrical portion 14 on outer conduit part A.

A spring ring D includes inner and outer parallel cylindrical spring legs 40, 42 whose longitudinal axes are coincidental with longitudinal axis 22. Inner and outer spring ring legs 40, 42 are integrally connected by a spring ring connecting wall 44 which extends generally radially of the axis 22 in the arrangement shown and it will be recognized that this wall can be inclined substantially out of the radial position. The outer diameter of outer spring ring leg 42 is approximately the same as the inner diameter of cylindrical portion 12 on outer conduit part A. Spring ring D is smoothly curved between outer leg 42 and connecting wall 44 thereof to generally conform with the inner curvature of outer conduit part A between cylindrical portion 12 and connecting wall 20 thereof. Inner spring leg 40 has an inner surface which is approximately coincidental with the inner surfaces of conduit portions 14 and 36. Inner spring ring leg 40 has a length substantially greater than spring ring outer leg 42, and a backup ring E is closely received over spring ring inner leg 40. The longitudinal axis of backup ring E is coincidental with axis 22, and such ring includes a radial leg 46 extending generally radially of axis 22 and a longitudinal leg 48 extending generally parallel to axis 22. Longitudinal leg 48 is welded or otherwise suitably fixed to spring ring inner leg 40.

A retainer ring F is received over longitudinal leg 48 of backup ring E, and includes a generally radial leg 52 and a generally longitudinal leg 54. The inner diameter of retainer ring longitudinal leg 54 is substantially greater than the outer diameter of backup ring longitudinal leg 48 so that retainer ring F is free to shift generally radially of longitudinal axis 22. Retainer ring F loosely receives a longitudinally split carbon bearing ring 58. Bearing ring 58 is longitudinally split for providing radial expansion and contraction thereof. Although bearing ring 58 is referred to as being longitudinally split, it will be recognized that the plane of the split does not necessarily extend parallel to longitudinal axis 22. That is, ring 58 may be split such that the surfaces on opposite sides of the split actually face one another in a direction parallel to longitudinal axis 22. In other words, the end surfaces on opposite sides of the split lie in planes which intersect axis 22. It will be recognized that all of the longitudinally split rings identified in this application may be split in a similar manner. Bearing ring 58 is shaped to have outer surfaces generally corresponding with the inner surfaces of retainer ring legs 52, 54, and has an outer circumferential surface or area 60 which is shaped to correspond with the generally spherical inner surface 28 of curved end portion 24 on inner conduit B. A flat shim ring 62 is positioned between radial legs 46, 52 on backup ring E and retainer ring F for locating carbon bearing ring 58 in a desired position. It will be recognized that carbon bearing ring 58 may be formed of other suitable materials having a very low coefficient of friction or of composite materials. For example, metal or plastic impregnated with graphite or other lubricants can be used for certain applications. Retainer ring F and carbon bearing ring 58 together define an inner ring assembly used in the joint.

An outer ring assembly includes a retainer ring G which is circumferentially continuous as is retainer ring F. Retainer ring G includes a radial leg 64 and a longitudinal leg 66 which is turned inwardly slightly at its free end to provide a radial flange 68. A pair of side-by-side longitudinally split primary and secondary carbon sealing rings 70, 72 are received in retainer ring G between radial leg 64 and radial flange 68 thereof. Sealing rings 70, 72 are inwardly collapsible a sufficient distance for moving such rings past radial flange 68. Sealing rings 70, 72 are positioned with the splits therein circumferentially-spaced a substantial distance from one another so that leakage past the split in ring 70 will not pass through the split in secondary sealing ring 72. Primary and secondary sealing rings 70, 72 have inner circumferences or circumferential areas 74, 76 shaped to generally correspond with outer surface 30 of spherically curved end portion 24 on inner conduit part B. Primary sealing ring 70 has a thickness parallel to longitudinal axis 22 which is substantially greater than the thickness of secondary sealing ring 72. The inner circumference of secondary sealing ring 72 is cut off to have a portion 78 extending substantially parallel to the longitudinal axis 22. This shortens curved inner circumferential area 76 of secondary sealing ring 72 so that such area 76 has an axial length substantially less than the axial thickness of sealing ring 72, and substantially less than the outer axial circumference thereof. Retainer ring G, together with sealing rings 70, 72, define an outer ring assembly for the joint.

An assembly ring H includes a generally radially extending leg 82 and a generally longitudinally extending leg 84. Assembly ring H has a free circular terminal end 86 substantially aligned with terminal end 16 on outer conduit part A. A plurality of circumferentially-spaced holes 88, 89 in assembly ring longitudinal leg 84 and outer conduit portion 12 are radially aligned for receiving rivets 90. An outwardly opening circumferential groove in assembly ring longitudinal leg 84 is located between rivet holes 88 and terminal end 86 thereof for receiving an O-ring 92 to form a seal between assembly ring H and outer conduit part A. At high temperatures, a sealant is used in place of the O-ring.

To assemble the joint of FIG. 1, spring ring D having backup ring E fixed thereto is first positioned within outer conduit part A in the position generally shown in FIG. 1. The inner ring assembly defined by inner retainer ring F and inner carbon ring 58 are then positioned over backup ring E. It is important to note that at this time no flat shim ring 62 is provided. Curved end portion 24 of inner conduit part B is then extended through outer conduit part A until inner surface 28 thereof engages inner carbon ring 58. The outer ring assembly defined by outer retainer ring G and carbon sealing rings 70, 72 is then positioned within outer conduit part A in engagement with outer surface 30 of curved end portion 24. Assembly ring H is then positioned within outer conduit part A with radial leg 82 thereof engaging radial leg 64 of retainer ring G. A predetermined axial force is then applied to assembly ring H for moving same in a direction from right to left in FIG. 1. This will cause spring ring D to yield to the left in FIG. 1 by deflection of spring ring connecting wall 44. With the predetermined force maintained on assembly ring H, curved end portion 24 will be generally axially squeezed between the inner and outer ring assemblies. In this position, terminal end 86 of assembly ring H will be longitudinally spaced inside of conduit A from terminal end 16. The distance by which terminal end 86 is spaced from terminal end 16 is then measured and the parts are disassembled. The parts are then reassembled and a shim ring 62 is chosen having an axial thickness corresponding to the distance by which terminal end 86 was spaced from terminal end 16. The predetermined axial force is again applied to assembly ring H and holes 88, 89 will then be radially aligned for receiving rivets 90. This holds the parts in assembled condition under a predetermined preloading force.

In the arrangement shown and described, the predetermined position of assembly ring H has terminal ends 16, 86 radially aligned when the joint is under predetermined preloading force. However, it will be recognized that other indicia may be provided for defining the predetermined position of assembly ring H in which the joint is preloaded with the predetermined force. For example, indicia may be provided on the exterior surface of longitudinal flange 84 for alignment with terminal end 16 on outer conduit part A or with other indicia on outer conduit part A. In the assembly procedure, the joint is simply assembled in the absence of the flat shim ring 62 and the predetermined axial preloading force is applied to assembly ring H. The axial displacement of assembly ring H from its desired predetermined position is then measured for determining the desired axial thickness of flat shim ring 62. The necessary parts of the joint are then disassembled and reassembled with shim ring 62 in position. It will be recognized that it is also possible to provide an assembly ring H which is threaded into enlarged portion 12 of outer conduit A. In the arrangement shown and described, axially yieldable spring means in the form of spring ring D is interposed between outer conduit part A and the inner ring assembly defined by inner retaining ring F combined with inner carbon bearing ring 58.

Fluid flow through the conduit parts is in either direction as indicated by arrow 102. The interior of the conduit parts is pressurized and this pressure causes generally radial outward expansion of curved end portion 24 on inner conduit part B. In addition, the internal pressure tends to move inner conduit part B to the right away from outer conduit part A. This causes outer surface 30 of curved end portion 24 to firmly engage outer carbon rings 70, 72 and effect a good seal. The fluid also leaks past inner carbon bearing ring 58 so that the outer circumferential areas of outer carbon rings 70, 72 are subjected to the fluid pressure. This fluid pressure acting on the outer circumferential areas of outer carbon rings 70, 72 biases such rings radially inwardly toward outer surface 30 of curved end portion 24. With inner circumferential area 76 of secondary sealing ring 72 having an axial length substantially less than the axial length of the outer circumferential area thereof, the inner circumferential area 76 engages outer surface 30 with a substantially greater unit pressure than inner circumferential area 74 of primary sealing ring 70.

Backup ring E and assembly ring H effectively define axially-spaced stops between which the inner and outer ring assemblies and the curved end portion of the inner conduit part are generally axially compressed. Inner conduit part B is free for limited universal pivotal movement about point 34 and is also freely rotatable, with the inner and outer ring assemblies defining the sole connection between the inner and outer conduit parts.

In a preferred arrangement, inner and outer surfaces 28, 30 of curved end portion 24 on inner conduit part B are coated with a material having a very low coefficient of friction. For example, an aqueous slurry of graphite may be suitably applied to such surfaces as by dipping or spraying and the coating is then baked onto the surfaces. Obviously, other coatings of material having a very low coefficient of friction may be applied to the surfaces depending upon the application and temperatures to which the joint will be exposed. Preferably, the coating applied to surfaces 28, 30 is of the same material as rings 58, 70 and 72. This arrangement makes it possible to place the joint under a very high predetermined preloading force for insuring a good seal while still allowing pivotal movement. In the absence of the use of low friction material, at least for rings 58, 70 and 72, it is possible that the preloading force would cause high loading so that inner conduit part B would not pivot easily, due to the high friction force exerted thereon by the inner and outer ring assemblies.

FIG. 2 shows another arrangement wherein outer conduit part A1 has a large diameter terminal end 16a and an opposite smaller diameter end portion which includes a radially inwardly extending stop flange 106. Terminal end 38a on inner conduit part B1 has an outwardly extending flange 108 for use in connecting the conduit part to another conduit, and the diameter of flange 108 is smaller than the hole through outer conduit part A1 surrounded by stop flange 106. Inner conduit part B1 has a generally spherically curved end portion 24a having inner and outer surfaces 28a, 30a. End portion 24a is curved generally about a point 34a located on longitudinal axis 22a. Outer conduit part A1 has an inclined wall 20a extending between stop flange 106 and large diameter outer conduit portion 12a.

In the arrangement of FIG. 2, spring ring D1 also defines the assembly ring for the joint, and includes axially and radially-spaced longitudinal legs 40a, 42a connected by an inclined spring ring wall 44a. A circumferentially continuous backup ring E1 is welded or otherwise secured exteriorly of spring leg 40a and loosely receives circumferentially continuous retainer ring F1. A carbon bearing ring 58a is received in retainer ring F1 and a flat shim ring 62a is interposed between backup ring E1 and retainer ring F1. The outer circumferential area of carbon bearing ring 58a is shaped to correspond with inner surface 28a on curved end portion 24a.

An outer backup ring 112 has a radial leg 114 positioned against flange 106 on outer conduit part A1. Outer backup ring 112 includes an inclined leg 116 which does not extend parallel to the inner surface of outer conduit part inclined wall 20a. Instead, inclined leg 116 diverges from the conduit part inclined wall 20a when proceeding from radial leg 114 toward the free end of inclined leg 116. The outer circumferential areas of carbon sealing rings 70a, 72a generally correspond to the inner surface of inclined leg 116 so that a cooperating cam action occurs urging the longitudinally split sealing rings 70a, 72a radially inwardly against outer surface 30a of curved portion 24a. Primary sealing ring 70a has an extension 118 spaced outwardly from outer surface 30a. A retainer ring 120 is welded to outer conduit part A1 and has a radial flange 122 engaging extension 118.

To assemble the joint of FIG. 2, all of the parts are moved into outer conduit part A1 through large diameter end 16a thereof. Backup ring 112, outer sealing rings 70a, 72a and retainer ring 120 are first assembled in the positions shown in FIG. 2. An axial force is applied to retainer ring 120 from left to right and retainer ring 120 is then welded to outer conduit part A1 while the force is maintained. Inner conduit part B1 is next inserted to the position shown. Backup ring E1 is preassembled to spring ring D1. The inner ring assembly defined by inner retainer ring F1 and inner carbon bearing ring 58a is then positioned on backup ring E1. Spring ring D1 is then extended into outer conduit part A1 until carbon bearing ring engages inner surface 28a of curved end portion 24a. A predetermined axial force is then applied to spring ring D1 urging same from left to right in FIG. 2 and inclined spring ring wall 44a deflects slightly. With this predetermined preloading force applied to the joint, the axial displacement between holes 88a, 89a is measured for choosing a flat shim ring 62a having a axial thickness corresponding to this axial displacement. Spring ring D1 is then removed for inserting shim ring 62a between backup ring E1 and retainer ring F1. Spring ring D1 is then returned to the position shown in FIG. 2 and the predetermined axial force is again applied thereto. Holes 88a, 89a will then be aligned and while the predetermined axial force remains applied, rivets 90a are extended through the holes for securing the joint together as shown in FIG. 2 with curved end portion 24a being squeezed generally axially with predetermined preloading force between the inner and outer ring assemblies.

In the arrangement of FIG. 1, radial legs 46, 82 on backup ring E and assembly ring H provide spaced axial stops, and axially yieldable spring means D is interposed between stop 46 and outer conduit part A. In the arrangement of FIG. 2, spring means D1 is interposed between axial stop E1 and outer conduit part A1.

FIG. 3 shows a joint for providing rotational, longitudinal and pivotal movement between conduits joined thereby. The pivotal portion of the joint is essentially the same as the joint of FIG. 1 and parts in FIG. 3 which generally corresponds to those in FIG. 1 are given corresponding reference letters and numbers. Outer conduit part I includes large and small diameter cylindrical wall portions 212, 214 joined by an integral inclined wall portion 216. Large diameter cylindrical portion 212 has a terminal end 218, and small diameter cylindrical portion 214 has a circular terminal end 222.

An inner guide ring J includes radially and axially-spaced inner and outer cylindrical walls 224, 226 integrally joined by a connecting wall 228. Outer wall 226 is welded or otherwise suitably secured to small diameter portion 214 of outer conduit part I. An outer guide ring K includes inner and outer radially-spaced cylindrical walls 230, 232. A plurality of aligned circumferentially-spaced holes through walls 212, 232 receive rivets 236 for holding the guide ring in the position shown in FIG. 3.

A piston L has cylindrical walls 240, 242 and a radial flange 244. Cylindrical portions 248, 250 of increased radial thickness are provided externally of cylindrical walls 240, 242 so the piston has sufficient radial thickness for providing outer circumferential grooves receiving carbon guide rings 252, 254, and carbon sealing rings 256, 257, 258 and 259. A hole 260 is provided in cylindrical wall 240 to establish communication between the interior of the piston and the external space on one side of flange 244. The space on the other side of such flange communicates with atmosphere through vent openings 262.

The outer end portion of piston flange 244 has an outwardly opening circumferential groove receiving carbon sealing rings 266, 267.

In the arrangement of FIG. 3, spring ring D2 has leg 44b thereof inclined away from wall 228 of guide ring J in order to provide axial yieldability. The joint of FIG. 3 is used by suitably connecting piston L to one conduit while inner conduit part B is connected with another conduit. Piston L is capable of substantially axial movement for accommodating such movement in the joined conduits. Rotatability between the joined conduits is also provided by piston L and inner conduit part B. Pivotal movement is provided by inner conduit part B.

In the improved joint of the present application, pivotal movement is provided over at least five degrees in any direction from a horizontal centerline. This flexiblity is provided by the use of spherical seals and bearings without requiring any bellows or gimbals. Flexure moment loads remain relatively uniform throughout the life of the joint and this is an improvement over metal-to-metal designs which show a great increase in bend load during life of the joint. The flexible joint is designed to be maintenance free during its life. However, in case of damage during service, the design of the joint is such that it is easily repaired. The improved flexible joint uses only inert materials which have unlimited shelf life and are impervious to jet fuels, hydraulic fluids, skydrols and oxidizers. The design of the present application provides for rotational movements between the joined conduits while maintaining the capability of pivotal movement and meeting all leakage requirement. The double sets of seals and bearings assure minimum leakage and also provide seal redundancy. The flexible joint also exhibits very low pressure loss so that it is essentially equivalent to a straight section and also requires no liner. Leakage through the flexible joint actually reduces with usage because the seals wear in.

In the arrangement of the present application, inner and outer spherical seats on the spherically curved end portion of the inner conduit part rotate or slide against inner and outer combined bearing and sealing assemblies. Both bearing and sealing assemblies are made in a similar manner from carbon graphite rings. The outer bearing and sealing assembly takes the bearing load due to pressure loading, while the inner bearing and sealing assembly is mechanically loaded by a spring force to handle compressive loads and also to preload the outer bearing and sealing assembly. The inner bearing and sealing assembly acts as a seal. The pressure loading forces the outer bearing and sealing assembly tighter against the outer spherical seat so it also provides good sealing. The carbon graphite bearing and sealing rings are contained by metal rings so that all loading is in a compressive direction and the loads are well under the allowable compressive strength for carbon graphite.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A flexible joint for conduit comprising: inner and outer conduit parts, said inner conduit part having a generally spherically curved end portion received in said outer conduit part and having inner and outer spherically curved surfaces, inner and outer ring assemblies including inner and outer radially opposed rings of low friction material engaging said inner and outer surfaces, and preloading means for axially preloading said joint and holding said inner and outer rings against said inner and outer surfaces with a predetermined preloading force, said preloading means including generally axially yieldable spring means which cooperate with said outer conduit part to hold said spring means in place, said inner ring assembly being carried by said spring means.

2. The joint of claim 1 wherein said preloading means includes inner and outer axial stops on said outer conduit part, said ring assemblies and said curved end portion being under generally axial compression between said inner and outer axial stops, said inner stop including a backup ring secured to said spring means, a portion of said spring means abutting against and being held in position by a curved wall portion of said outer conduit part and said outer stop including an assembly ring secured to said outer conduit part, a portion of said outer ring assembly abutting against said assembly ring.

3. The joint of claim 1 wherein said spring means is an axially yieldable spring ring fixed to said outer conduit part, and wherein an inner backup ring is fixed to said spring ring, said inner ring assembly being positioned against said inner backup ring with said inner ring of low friction material engaging said inner surface of said curved end portion on said inner conduit part, said preloading means also including an assembly ring fixed to said outer conduit part in compressive engagement with said outer ring assembly and holding said spring ring axially deflected for providing said preloading force.

4. The joint of claim 1 wherein said preloading means also includes inner and outer axial stops said inner axial stop being secured to said spring means and said outer axial stop being secured to said outer conduit part, said ring assemblies and said curved end portion being generally axially compressed between said inner and outer axial stops, and said spring means being interposed between at least one of said stops and one of said ring assemblies.

5. The joint of claim 1 wherein said preloading means also includes inner and outer axial stops said inner axial stop being secured to said spring means and said outer axial stop including an inclined wall portion of said outer conduit part, said ring assemblies and said curved end portion being generally axially compressed between said inner and outer axial stops, and said spring means being interposed between at least one of said stops and said conduit.

6. The joint of claim 1 wherein one of said ring assemblies includes a pair of side-by-side rings of low friction material having inner and outer circumferential areas, one of said inner and outer circumferential areas engaging one of said surfaces on said curved end portion and the other of said circumferential areas being exposed to fluid pressure within said conduits, and one of said pair of rings having said one circumferential area substantially smaller than said other circumferential area thereof, whereby fluid pressure acting on said other circumferential area of said pair of rings moves said pair of rings generally radially inwardly for firmly engaging in a sealing relationship said one circumferential area of said pair of rings with said one surface on said curved end portion and said one circumferential area on said one of said pair of rings engages said one surface with greater force than the one circumferential area on the other of said pair of rings.

7. The joint of claim 1 wherein said one ring of said pair of rings has an axial width substantially smaller than the axial width of the other of said pair of rings.

8. The joint of claim 1 wherein said outer ring assembly includes a pair of side-by-side axially split rings of low friction material, said pair of rings defining primary and secondary rings, said curved end portion of said inner conduit part having a terminal end within said outer conduit part, said primary ring being closer to said terminal end than said secondary ring, said primary and secondary rings having inner circumferential areas engaging said outer surface of said curved end portion on said inner conduit part in a sealing relationship, said primary and secondary rings having generally opposite outer circmferential areas exposed to fluid pressure within said conduits, and said inner circumferential area of said secondary ring being substantially smaller than said outer circumferential area thereof, whereby fluid pressure acting on said outer circumferential areas moves said primary and secondary rings generally radially inwardly and urges said inner circumferential area of said secondary ring against said outer surface with substantially greater unit pressure than said inner circumferential surface of said primary ring.

9. The joint of claim 8 wherein said secondary ring has an axial width substantially less than said primary ring.

10. The joint of claim 1 wherein said spring means has two degrees of freedom thereby allowing said inner ring assembly to be moved both axially and transversely.

11. The joint of claim 1 wherein said rings are of carbon.

12. The joint of claim 11 wherein said outer ring assembly includes a pair of outer carbon rings engaging said outer surface.

13. The joint of claim 12 wherein said pair of outer carbon rings include primary and secondary rings, said primary ring having an axial thickness substantially greater than said secondary ring.

14. The joint of claim 13 wherein said curved end portion of said inner conduit part has a terminal end and said primary ring is located closer to said terminal end than said secondary ring.

15. The joint of claim 1 wherein said preloading means includes an inner axial stop fixed to said outer conduit part for cooperation with said spring means and said inner ring assembly, said outer conduit part including an outer conduit part terminal end through which said curved end portion of said inner conduit part is received, said preloading means also including an assembly ring fixedly received in said outer conduit part and in engagement with said outer ring assembly and holding said inner and outer ring assemblies and the areas of said curved end portion engaged thereby in compression between said inner axial stop and said assembly ring to provide said preloading force.

16. The joint of claim 15 including seal means between said assembly ring and said outer conduit part for preventing leakage of fluid therebetween.

17. The joint of claim 15 wherein said assembly ring has an assembly ring terminal end located in a predetermined position relative to said outer conduit part terminal end for providing said predetermined preloading force.

18. The joint of claim 17 including shim means between said inner axial stop and said inner ring assembly for providing said predetermined preloading force when said assembly ring terminal end is in said predetermined position relative to said outer conduit part terminal end.

19. The joint of claim 17 wherein said assembly ring terminal end in said predetermined position thereof is substantially aligned with said outer conduit part terminal end.

20. A flexible joint for conduit comprising: inner and outer conduit parts having a common longitudinal axis, said inner conduit part including a generally spherically curved end portion received in said outer conduit part and having inner and outer spherically curved surfaces, said curved end portion being curved about a point on said axis, inner and outer radially opposed ring assemblies carried by said outer conduit part and between which said inner and outer spherically curved surfaces are squeezed with a predetermined preloading force by preloading means, said preloading means including a generally axially yieldable spring ring interposed between said outer conduit part and said inner ring assembly, said inner ring assembly being mounted on said spring ring, said ring assemblies providing the sole connection between said conduit parts, and said conduit parts being pivotally movable relative to one another during which said ring assemblies and said inner and outer surfaces slide past one another.

21. The joint of claim 20 wherein the preloading means also includes axially-spaced stops carried by said outer conduit part and between which said curved end portion and said ring assemblies are generally axially squeezed.

22. The joint of claim 21 wherein said spring ring has two degrees of freedom whereby said inner ring assembly can be moved both axially and transversely.

23. A flexible joint for conduit comprising: inner and outer conduit parts having a common longitudinal axis, connecting means cooperating with said outer conduit part for connecting said conduit parts for limited relative pivotal movement substantially about a point on said axis, said inner conduit part including a generally spherically curved end portion received in said outer conduit part and having inner and outer spherically curved surfaces, said curved end portion being curved generally about said point, at least one of said inner and outer surfaces having a coating of low friction material thereon, and a sealing ring of low friction material carried by said outer conduit and being in sliding sealing engagement with said one surface said connecting means including inner and outer radially opposed ring assemblies engaging said inner and outer spherically curved surfaces and a spring ring having two degrees of freedom which carries said inner ring assembly, said outer ring assembly being carried by said outer conduit part.

24. The joint of claim 23 wherein both of said inner and outer surfaces are coated with low friction material, and wherein said inner and outer sealing rings of low friction material, carried by said inner and outer ring assemblies respectively, are respectively in sliding sealing engagement with said inner and outer surfaces.

25. The joint of claim 24 including preloading means for generally axially squeezing said curved end portion between said inner and outer rings, and said connecting means being defined by said rings and their engagement with said curved end portion.

26. The joint of claim 24 wherein the same low friction material which constitutes said inner and outer sealing rings is used to coat said inner and outer surfaces thereby allowing pivotal movement under very high preloading forces while still providing a good seal.

27. The joint of claim 26 wherein the low friction material is carbon.

* * * * *